G. W. BEADLE.
MACHINE FOR MANUFACTURING SUPPORTS FOR INCANDESCENT LAMP FILAMENTS.
APPLICATION FILED NOV. 22, 1909.

1,046,724.

Patented Dec. 10, 1912.

4 SHEETS—SHEET 1.

WITNESSES:
C. L. Belcher
Otto S. Schairer

INVENTOR
George W. Beadle
BY
Wesley G. Carr
ATTORNEY

G. W. BEADLE.
MACHINE FOR MANUFACTURING SUPPORTS FOR INCANDESCENT LAMP FILAMENTS.
APPLICATION FILED NOV. 22, 1909.

1,046,724.

Patented Dec. 10, 1912.

4 SHEETS—SHEET 2.

WITNESSES:
C. L. Belcher
Otto S. Schairer

INVENTOR
George W. Beadle
BY
ATTORNEY

G. W. BEADLE.
MACHINE FOR MANUFACTURING SUPPORTS FOR INCANDESCENT LAMP FILAMENTS.
APPLICATION FILED NOV. 22, 1909.
1,046,724.
Patented Dec. 10, 1912.
4 SHEETS—SHEET 3.
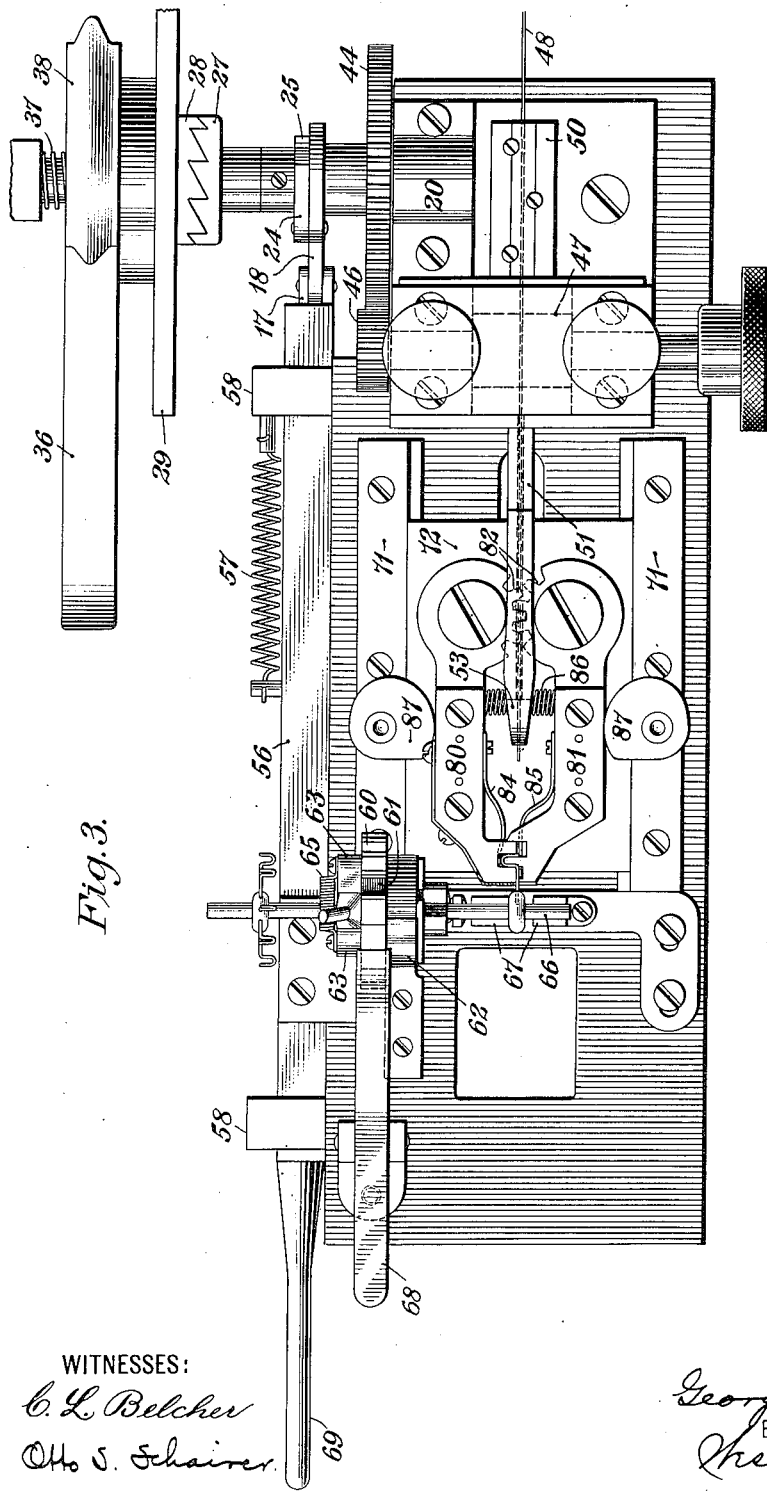
WITNESSES:
C. L. Belcher
Otto J. Schairer
INVENTOR
George W. Beadle
BY
Wesley G. Carr
ATTORNEY

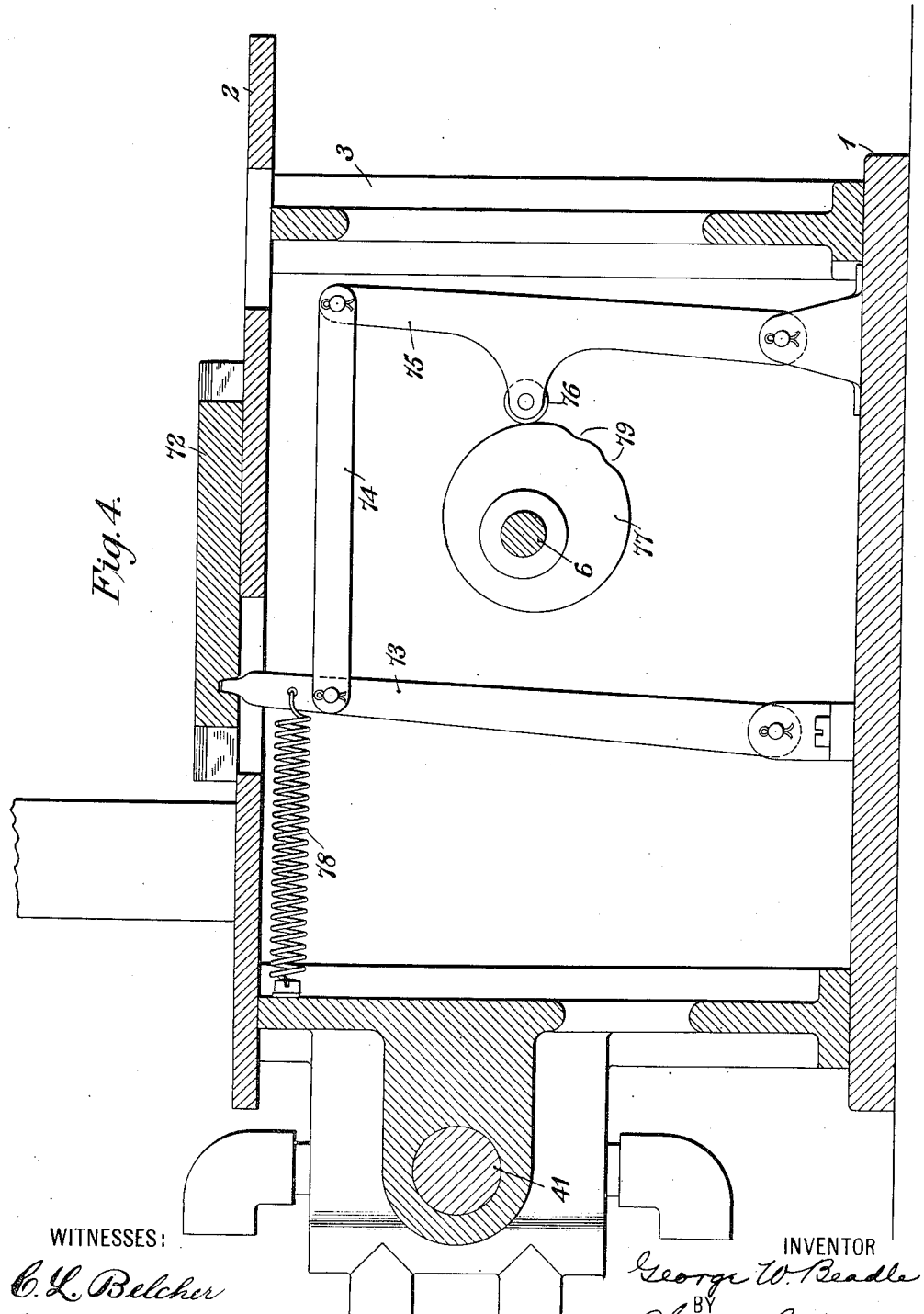

UNITED STATES PATENT OFFICE.

GEORGE W. BEADLE, OF EAST ORANGE, NEW JERSEY, ASSIGNOR TO WESTINGHOUSE LAMP COMPANY, A CORPORATION OF PENNSYLVANIA.

MACHINE FOR MANUFACTURING SUPPORTS FOR INCANDESCENT-LAMP FILAMENTS.

1,046,724. Specification of Letters Patent. Patented Dec. 10, 1912.

Application filed November 22, 1909. Serial No. 529,335.

*To all whom it may concern:*

Be it known that I, GEORGE W. BEADLE, a citizen of the United States, and a resident of East Orange, in the county of Essex and State of New Jersey, have invented a new and useful Improvement in Machines for Manufacturing Supports for Incandescent-Lamp Filaments, of which the following is a specification.

My invention relates to machines that are utilized in the manufacture of incandescent lamps, and it has for its object to provide a machine by means of which wire anchors or supporting devices for the filaments of incandescent lamps may be accurately and expeditiously inserted in glass arbors or stems.

Figure 1:
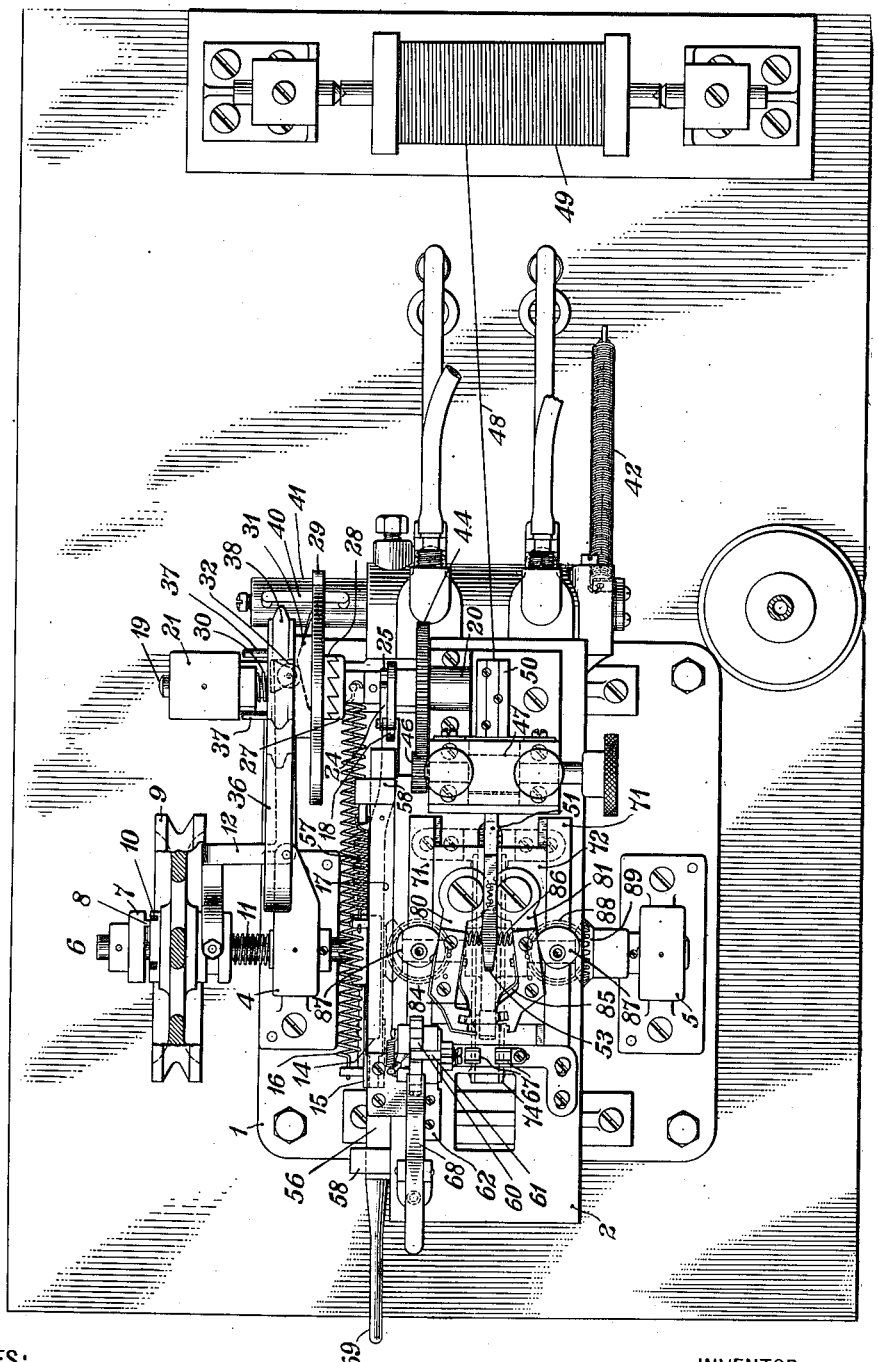
Figure 2:
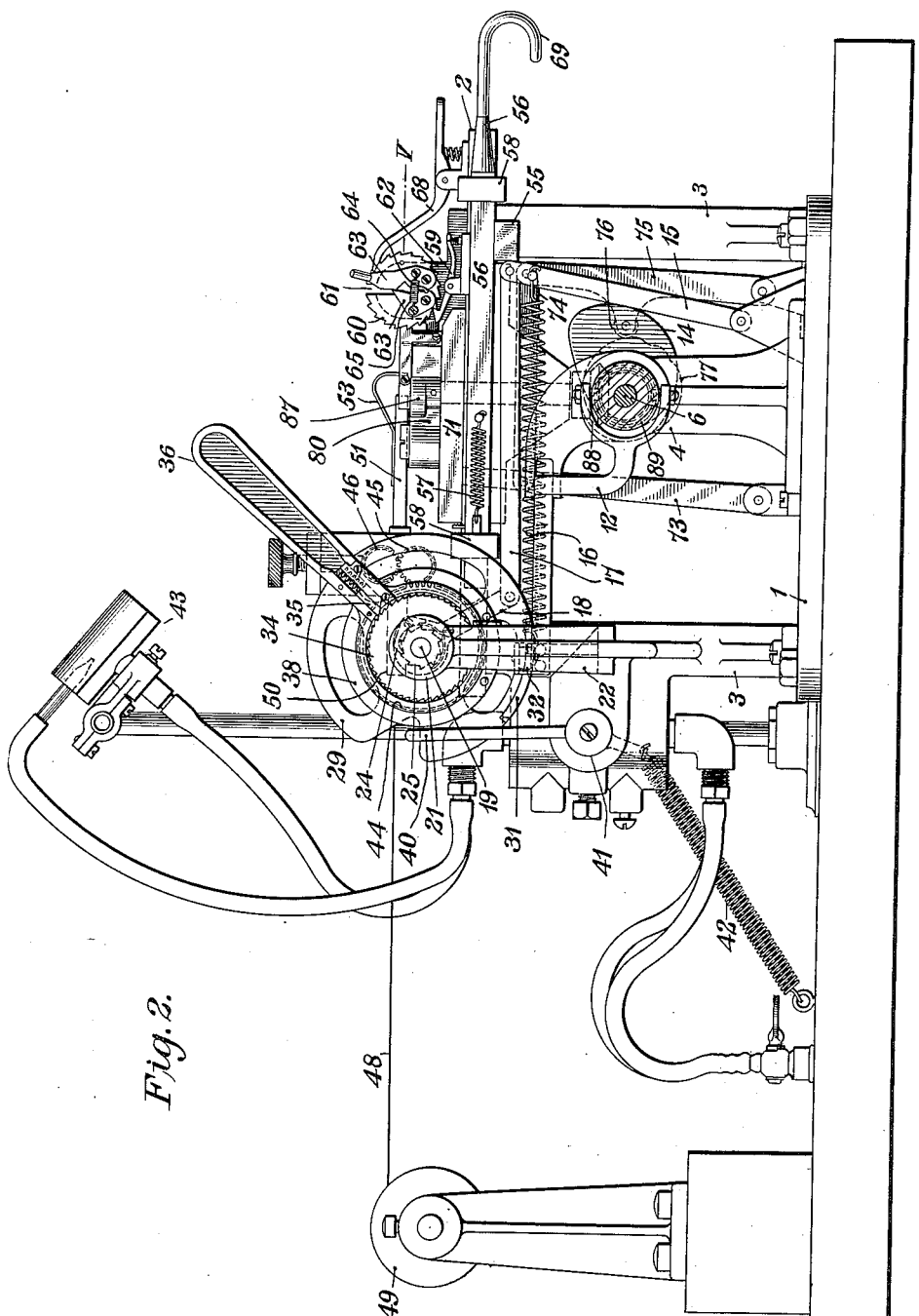

Figure 1 of the accompanying drawings is a plan view of a machine embodying my present invention. Fig. 2 is a view, in side elevation, of the same machine. Fig. 3 is an enlarged plan view of some of the parts of the machine. Fig. 4 is an enlarged view, in side elevation and in section, of some of the parts of the machine, and Fig. 5 is a sectional view of some of the parts on the line V of Fig. 2.

The frame of the machine comprises a base member 1 and a platform or table 2 that is supported above the base member by means of standards 3. Mounted upon opposite sides of the base member 1 are pedestals 4 and 5, respectively, having bearings for a main driving shaft 6, upon one end of which are mounted a clutch member 7, that is rigidly secured thereto and is provided upon its inner face with a radial boss or projection 8, and a loose driving pulley 9 having radial recesses or notches 10 in the outer annular face of its hub which are provided for the reception of the radial boss 8 upon the clutch member 7. The driving pulley 9 is pressed toward the clutch member 7 by means of a helical compression spring 11 that surrounds the driving shaft and is interposed between the bearing pedestal 4 and the driving pulley, the spring 11 tending to effect an operative connection between the driving pulley and the shaft 6, to which the clutch member 7 is rigidly secured. The driving pulley may be moved out of engagement with the clutch member against the action of the spring 11, so as to interrupt the operative connection between the same and the driving shaft, by means of a lever 12 that is actuated as will be hereinafter set forth. Mounted upon the shaft 6, near the bearing pedestal 4, is a cam 14, with the cam surface of which an arm 15 is maintained in engagement by means of a helical tension spring 16, a link 17 being interposed between the upper free end of the arm 15 and the end of a downwardly extending arm 18 that is loosely mounted upon a counter-shaft 19 having bearings 20 and 21 carried respectively by the table 2 and an arm 22 that projects laterally and upwardly from one of the table-supporting standards. The arm 18 carries a pawl 24 for engaging a ratchet 25 that is rigidly secured to the counter-shaft 19, thus providing means whereby the cam 14, acting through the parts 15, 17, 18, 24 and 25, may periodically actuate the counter-shaft 19.

Rigidly secured to the counter-shaft 19 is a clutch member 27 having teeth, the faces of which are respectively parallel to the axis of the counter-shaft and inclined thereto, the said clutch member engaging a similar and corresponding member that is attached to the inner annular face of a cam 29, the cam surface of which is almost entirely circular, but is provided with a notch in one side. The clutch members 27 and 28 are normally maintained in engagement, for the purpose of effecting an operative connection between the cam 29 and the counter-shaft 19, by means of a helical compression spring 30 that surrounds the counter-shaft 19 and is interposed between the bearing 21 and the outer annular face of the cam 29. Upon the outer annular face of the cam 29 is a boss or projection 31 having inclined faces with which a roller 32 carried by the arm 12 engages, the function of the boss 31 being to actuate the arm 12 once during each revolution of the counter-shaft 19 and to thereby interrupt the operative connection between the driving pulley 9 and the driving shaft 6.

In order that the cam 29 may be rotated manually and independently of the clutch member 27, a ratchet 34 is provided upon its hub, and a spring-pressed pawl 35 carried by an arm 36 is provided to engage therewith, the said arm having a handle by means of which the pawl may be operated manually. The arm 36 is limited in its arc of movement by means of two pins 37 that project from the annular face of a dish-shaped member 38 that is loosely mounted on the counter-shaft 19 and carries the arm 36, and also overhangs the ratchet 34, the said pins being adapted to engage the arm or bracket 22 upon opposite sides thereof.

The cam 29 is engaged by a looped-wire arm 40 that is mounted at one end of a shaft 41, at the other end of which is a spring 42 for maintaining the said arm in engagement with the cam. The shaft 41 is the movable member of an economizing valve which governs the supply of gas and air to a torch 43 whereby a flame is directed upon the arbors into which the anchors or filament-supporting devices are inserted. The economizing valve is provided for the purpose of reducing the supply of gas and air to the torch when the machine is at rest, and to that end, may be of any suitable construction, and it is accordingly not deemed necessary to illustrate the same in detail, it being sufficient to state that, when the upper end of the arm 40 occupies the notch in the cam 29, the air and gas supply is reduced, and that, when the said arm engages the remaining portions of the cam, the air and gas supply is on full force.

Rigidly secured upon the inner end of the counter-shaft 19 is a gear 44 which meshes with a pinion 45 that, in turn, meshes with a second pinion 46, the said pinions being connected to a pair of feed rolls 47 for advancing a wire 48 from which the anchors or filament-supporting devices are constructed. The wire 48 is drawn from a roll 49 and passes, before reaching the feed rolls 47, through a guide 50, that is of substantially the same diameter as the wire and serves to straighten the same and to remove kinks therefrom. As the wire leaves the feed rolls, it passes into a tubular guide 51, and then through an aperture in the end of a spring 53 that serves as an auxiliary guide and is secured to the main guide 51.

The upper end of the arm 15 engages a block 55, that is carried by a reciprocating member 56 and is maintained in engagement with the said arm by means of a helical tension spring 57, the reciprocating member 56 being supported by guide blocks 58 that are secured to one side of the platform 2. The member 56 carries a pawl 59 that engages a ratchet 60 having a slot 61 which extends radially inward somewhat beyond its center. The ratchet 60 is rotatably mounted in a post 62 that projects upwardly from the platform 2, and is also provided with a slot in its upper end corresponding to the slot in the ratchet. Upon one end face of the ratchet 60 are pivotally mounted two jaws 63 that are operatively connected, by means of a tooth 64, and are normally maintained closed by means of a spring 65, one of the jaws being provided with a handle whereby they may be opened and closed manually. The slots in the ratchet 60 and in the post 62 are provided for the reception of an arbor 66 into which the anchors or filament-supports are inserted, the said arbors being cylindrical and lying in the slots substantially concentrically with the ratchet 60, in which position they are held by means of the jaws 63. The arbor is further supported and centered by means of two posts 67 that are adjustably secured to the platform 2. The ratchet 60 is prevented from moving backward by means of a spring-pressed detent 68. The member 56 and the ratchet 60 may be actuated independently of the arm 15 and other parts of the machine by means of a handle 69 upon the member 56, such independent operation being permitted because there is no rigid connection between the arm 15 and the block 55.

Mounted in guides 71 upon the platform 2 is a carriage 72 that is reciprocated by link and lever mechanism comprising an arm 73, a link 74 and a lever 75, the lever 75 carrying a roller 76 that is maintained in engagement with a cam 77 by means of a spring 78. The cam 77 is mounted upon the main driving shaft 6, and is substantially an eccentric in shape, in order to simply effect reciprocation of the lever 75 and of the carriage 72. Near the point of greatest radius, however, the cam is provided with two depressions or recesses 79 which impart a jerking or auxiliary reciprocating motion to the carriage at, or near, the forward limit of its travel. The purpose of the auxiliary reciprocating motion is more fully explained hereinafter.

Pivotally mounted upon the upper face of the carriage 72 are jaws 80 and 81 that are provided, near their pivotal points, with intermeshing spurs 82 for causing the same to move simultaneously and similarly. The jaws are provided at their free ends with teeth that are adapted to intermesh when the jaws are closed, and to grip and bend the wire 48 as it is fed thereinto, the rear teeth upon the jaws serving to sever the short piece of wire between the jaws from the continuous length. The shape of the teeth at the free ends of the jaws is such as to form a hook at one end of the short severed piece of wire, thereby giving the said wire the desired shape of the anchor or filament-support.

As shown in Fig. 3, an anchor of finished form has just been inserted, by the jaws, into the arbor 66, the carriage 72 and the jaws 80 and 81 being then at the forward limits of their travel. In order to insure fastening of the anchors in the arbors, the carriage for the jaws is given an auxiliary reciprocating or jerking motion by the cam 77, as above described, it having been found in practice that the anchor will be more securely fastened in the glass of the arbor if it is first inserted therein and then removed, or partially removed, and reinserted. It will, of course, be understood that the torch directs a flame only upon the portion of the arbor into which the anchors are inserted, and that the glass of the arbors is soft at the time of the insertion of the anchors. In order to insure discharging of the anchors from the jaws 80 and 81 when the same are open, stripping springs 84 and 85 are secured to the inside faces of the jaws, the upturned ends of which bear against the anchor, upon each side thereof, in a manner which will be understood from the illustration. A helical compression spring 86 is interposed between the jaws 80 and 81 for the purpose of exerting a resilient force which tends to open them. The jaws are closed, against the pressure of the spring 86, by means of cams 87 that bear against the outer edges thereof and are actuated by means of beveled gears 88 which mesh with corresponding gears 89 upon the main driving shaft 6. The shape and arrangement of the cams is such that the jaws are closed during the forward stroke thereof, and are opened quickly just before the backward stroke begins, and remain open during the backward stroke. The action of the jaws, therefore, is to grip the wire 48 a short distance from its end just after the completion of the backward stroke and to sever a short piece of the wire from the continuous length. At the same time, the wire is shaped by the teeth at the ends of the jaws and is then carried forward by the jaws until its straight end is inserted in the arbor, and then removed, or partially removed, and reinserted. As soon as the anchor is inserted in the arbor, the jaws are opened and the backward stroke thereof begins. The arrangement of the parts is also such that the wire 48 is fed toward and between the jaws during the backward stroke thereof, and that the arbor 66 is rotated or advanced a predetermined amount during the backward stroke of the jaws.

I claim as my invention:

1. A machine of the character described comprising a rotatable work holder, a stationary support therefor, means for periodically rotating the work holder through predetermined numbers of degrees less than 360, a pair of forming and cutting jaws that are reciprocable with respect to the work holder, and means for feeding material to the jaws.

2. A machine of the character described comprising an intermittently rotated work holder, a stationary support therefor, a pair of forming and cutting jaws that are reciprocable with respect to the work holder, and means for feeding material to the jaws.

3. A machine of the character described comprising a rotatable work holder, a stationary support therefor, pawl and ratchet means for periodically rotating the work holder, a pair of forming and cutting jaws that are reciprocable with respect to the work holder, and means for feeding material to the jaws.

4. A machine of the character described comprising an intermittently actuated arbor holder, a pair of jaws that are reciprocable with respect to the arbor holder, means for causing the same to close during their forward strokes and to open during their backward strokes, and means for feeding material to the jaws during the backward strokes thereof.

5. A machine of the character described comprising an intermittently actuated arbor holder, a pair of jaws that are reciprocable with respect to the arbor holder, cams in the paths of movement of the jaws governing opening and closing thereof, and means for feeding material to the jaws.

6. A machine of the character described comprising an arbor holder, a pair of jaws, and means for imparting thereto a main and an auxiliary reciprocating motion with respect to the arbor holder, the auxiliary reciprocating motion being at the limit of the forward stroke of the main reciprocating motion.

7. A machine of the character described comprising a rotatable work holder, a stationary support therefor, means for periodically rotating the work holder, a pair of jaws that are reciprocable with respect to the work holder, and means for feeding material to the jaws.

8. A machine of the character described comprising an arbor holder, a pair of jaws, and means for effecting a main and an auxiliary relative reciprocating motion between the said parts, the auxiliary reciprocating motion occurring at the limit of the forward stroke of the main reciprocating motion.

9. A machine of the character described comprising an arbor holder, a pair of jaws, and means for effecting a main and an auxiliary relative reciprocating motion between the said parts.

10. A machine of the character described comprising a rotatable work holder, a stationary support therefor, means for periodically rotating the work holder, a pair of forming and cutting jaws that are reciprocable with respect to the work holder, means for feeding material thereto, and means for periodically applying heat to the work mounted in the work holder.

11. A machine of the character described comprising a driving member, a pair of reciprocating jaws, an intermittently actuated arbor holder with respect to which the jaws reciprocate, and means for rendering the driving member ineffective after the jaws have made a predetermined number of strokes.

12. A machine of the character described comprising a main shaft, a driving pulley thereon, a pair of reciprocating jaws, an intermittently actuated arbor holder with respect to which the jaws reciprocate, means for connecting the pulley to the shaft and for disconnecting it therefrom when the jaws have made a predetermined number of strokes.

In testimony whereof, I have hereunto subscribed my name this 12th day of November, 1909.

GEORGE W. BEADLE.

Witnesses:
F. H. McSorley,
R. C. Karchner.